(12) United States Patent
Koike et al.

(10) Patent No.: US 8,206,877 B2
(45) Date of Patent: Jun. 26, 2012

(54) MEMBRANE ELECTRODE ASSEMBLY FOR FUEL CELL, FUEL CELL, AND FUEL CELL SYSTEM

(75) Inventors: Yosuke Koike, Chiryu (JP); Gang Xie, Anjo (JP); Yoshito Endo, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 3 days.

(21) Appl. No.: 12/744,856

(22) PCT Filed: Nov. 25, 2008

(86) PCT No.: PCT/IB2008/003205
§ 371 (c)(1),
(2), (4) Date: May 26, 2010

(87) PCT Pub. No.: WO2009/068958
PCT Pub. Date: Jun. 4, 2009

(65) Prior Publication Data
US 2010/0304240 A1 Dec. 2, 2010

(30) Foreign Application Priority Data
Nov. 27, 2007 (JP) .................. 2007-306254

(51) Int. Cl.
*H01M 4/86* (2006.01)
*H01M 4/88* (2006.01)
*H01M 4/90* (2006.01)
*H01M 4/92* (2006.01)

(52) U.S. Cl. ......... 429/523; 429/524; 429/526; 429/527

(58) Field of Classification Search ........... 429/400–535
See application file for complete search history.

(56) References Cited

U.S. PATENT DOCUMENTS

| | | | |
|---|---|---|---|
| 2004/0038808 A1 | 2/2004 | Hampden-Smith et al. | |
| 2004/0045819 A1* | 3/2004 | Ball et al. .................. | 204/292 |
| 2004/0142229 A1* | 7/2004 | Herman et al. ............. | 429/40 |
| 2005/0098101 A1 | 5/2005 | Shen et al. | |
| 2005/0250002 A1* | 11/2005 | Stanley et al. ............. | 429/44 |

FOREIGN PATENT DOCUMENTS

| | | |
|---|---|---|
| JP | 05-299105 A | 11/1993 |
| JP | 7-085874 A | 3/1995 |
| JP | 08-008808 A | 1/1996 |
| JP | 08-162123 A | 6/1996 |
| JP | 08-203537 A | 8/1996 |
| JP | 2004-047455 A | 2/2004 |
| JP | 2004-186049 A | 7/2004 |
| JP | 2005-056583 A | 3/2005 |
| JP | 09-265992 A | 10/2007 |
| WO | WO 2006/083038 A1 | 8/2006 |

* cited by examiner

*Primary Examiner* — Basia Ridley
*Assistant Examiner* — Jonathan G Leong
(74) *Attorney, Agent, or Firm* — Kenyon & Kenyon LLP

(57) ABSTRACT

A membrane electrode assembly includes an ion conducting membrane; an anode catalyst layer arranged on one side of the ion conducting membrane; a cathode catalyst layer arranged on the other side of the ion conducting membrane; an anode diffusion layer arranged on an outer side of the anode catalyst layer; and a cathode diffusion layer arranged on an outer side of the cathode catalyst layer. Only in the anode catalyst layer, the density of a first catalyst layer portion located close to the anode diffusion layer is smaller than the density of a second catalyst layer portion located close to the ion conducting membrane.

4 Claims, 9 Drawing Sheets

MEMBRANE ELECTRODE ASSEMBLY FOR FUEL CELL, FUEL CELL, AND FUEL CELL SYSTEM

This is a 371 national phase application of PCT/IB2008/003205 filed 25 Nov. 2008, claiming priority to Japanese Patent Application No. 2007-306254 filed 27 Nov. 2007, the contents of which are incorporated herein by reference.

BACKGROUND OF THE INVENTION

1. Field of the Invention

The present invention relates to a membrane electrode assembly for a fuel cell, a fuel cell, and a fuel cell system, which have an anode catalyst layer.

2. Description of the Related Art

A membrane electrode assembly for a fuel cell generally includes an ion conducting membrane that has two sides in the thickness direction, an anode catalyst layer laminated on one side of the ion conducting membrane, a cathode catalyst layer laminated on the other side of the ion conducting membrane, an anode diffusion layer laminated on the outer side of the anode catalyst layer, and a cathode diffusion layer laminated on the outer side of the cathode catalyst layer.

An anode fluid supplied to an anode may contain carbon monoxide that interferes with catalytic activity in the catalyst layer. In this case, as the duration of power generation increases, catalytic activity gradually reduces. This may cause a decrease in power generated by the fuel cell.

In light of the above situation, Japanese Patent Application Publication No. 8-203537 (JP-A-8-203537) describes a fuel cell that includes a membrane electrode assembly in which a layer that oxidizes carbon monoxide is provided at portion of the catalyst layer, adjacent to the diffusion layer.

In addition, Japanese Patent Application Publication No. 2004-186049 (JP-2004-186049) describes a membrane electrode assembly in which, focusing on porosity, both an anode catalyst layer and a cathode catalyst layer each have an increased porosity at a portion adjacent to a diffusion layer. Furthermore, Japanese Patent Application Publication No. 7-85874 (JP-A-7-85874) describes a membrane electrode assembly in which the amount of ruthenium supported is greater at the downstream side than at the upstream side to thereby suppress carbon monoxide (CO) poisoning at the downstream side.

According to the above described technologies, when the duration of power generation extends over a long period of time, a decrease in power generated by the fuel cell can be somewhat suppressed but it is not sufficient.

SUMMARY OF THE INVENTION

The invention provides a membrane electrode assembly for a fuel cell, a fuel cell, and a fuel cell system that advantageously suppress a decrease in generated power even when the duration of power generation extends over a long period of time.

A first aspect of the invention provides a membrane electrode assembly for a fuel cell. The membrane electrode assembly includes: an ion conducting membrane that has two sides in a thickness direction thereof; a porous anode catalyst layer that is laminated on one side of the ion conducting membrane and that has an anode catalyst that accelerates anode reaction; a porous cathode catalyst layer that is laminated on the other side of the ion conducting membrane and that has a cathode catalyst that accelerates cathode reaction; an anode diffusion layer that is laminated on an outer side of the anode catalyst layer and that allows an anode fluid to pass therethrough; and a cathode diffusion layer that is laminated on an outer side of the cathode catalyst layer and that allows a cathode fluid to pass therethrough. The anode catalyst in the anode catalyst layer contains a poisoning-suppression catalytic component that reduces poisoning of carbon monoxide contained in the anode fluid. The anode catalyst layer includes a first catalyst layer portion and a second catalyst layer portion. The first catalyst layer portion is located closer to the anode diffusion layer than the second catalyst layer portion, and the second catalyst layer portion is located closer to the ion conducting membrane than the first catalyst layer portion. The density of the first catalyst layer portion is smaller than the density of the second catalyst layer portion.

Carbon monoxide may be contained in an anode fluid. Carbon monoxide reduces catalytic activity of the anode catalyst in the anode catalyst layer. Moreover, when raw fuel is reformed into an anode fluid, carbon monoxide may be contained in the anode fluid. In this case, when the duration of service of the fuel cell extends for a long period of time, poisoning may occur in the anode catalyst and, as a result, the catalytic activity may be reduced. This may cause a decrease in power generated by the fuel cell. Then, in order to maintain desirable catalytic activity of the anode catalyst in the anode catalyst layer, the anode catalyst includes a catalyst component that reduces poisoning of carbon monoxide contained in the anode fluid (hereinafter, also referred to as poisoning-suppression catalytic component).

The anode catalyst layer has a porous structure so as to allow the anode fluid to pass therethrough. Although it may be identified in the manufacturing process, in the complete membrane electrode assembly, the first catalyst layer portion and the second catalyst layer portion are integrated and it may be difficult to identify them clearly. The first catalyst layer portion represents portion of the anode catalyst layer, located closer to the anode diffusion layer than the second catalyst layer portion. On the other hand, the second catalyst layer portion represents portion of the anode catalyst layer, located closer to the ion conducting membrane than the first catalyst layer portion.

As an anode fluid is supplied from the anode diffusion layer to the anode catalyst layer, the anode fluid initially flows from the anode diffusion layer into the first catalyst layer portion and then flows into the second catalyst layer portion, thus being transferred toward the ion conducting membrane side. The second catalyst layer portion is located closer to the ion conducting membrane than the first catalyst layer portion. Thus, the second catalyst layer portion is able to effectively contribute to power generation reaction at the anode side. Hence, it is undesirable that catalytic activity of the second catalyst layer portion is reduced due to carbon monoxide in terms of ensuring generating power.

Here, the density $\rho 1$ of the porous first catalyst layer portion is smaller than the density $\rho 2$ of the porous second catalyst layer portion. Thus, the specific surface of the first catalyst layer portion increases as compared with the specific surface of the second catalyst layer portion. Even when the duration of service extends over a long period of time, a decrease in power generated by the fuel cell is suppressed. This may be presumably due to the following reason.

The density $\rho 1$ of the first catalyst layer portion is smaller than the density $\rho 2$ of the second catalyst layer portion. Thus, the surface area per unit volume of the porous first catalyst layer portion increases as compared with the surface area per unit volume of the porous second catalyst layer portion. For this reason, when an anode fluid is supplied to the anode catalyst layer, in comparison with the case in which the density of the first catalyst layer portion is excessively large, the poisoning-suppression catalytic component contained in the first catalyst layer portion is more likely to contact carbon monoxide contained in the anode fluid. Thus, the poisoning-suppression catalytic component efficiently works. Furthermore, because the density $\rho 2$ of the second catalyst layer portion is larger than the density $\rho 1$ of the first catalyst layer portion, it can be expected to restrict circulation of poisoning carbon monoxide contained in the anode fluid to the second catalyst layer portion.

The pore diameter $\phi 1$ of the first catalyst layer portion is, for example, smaller than or substantially equal to the pore diameter $\phi 2$ of the second catalyst layer portion ($\phi 1 < \phi 2$ or $\phi 1 \approx 2$). Within the relationship of $\phi 1 < \phi 2$ or $\phi 1 \approx \phi 2$, $\phi 1 \phi 2$, for example, ranges from 0.1 to less than 1, ranges from 0.5 to 0.9, ranges from 0.5 to 0.8, ranges from 0.8 to less than 1, or ranges from 0.9 to less than 1. The pore diameter may be based on a median diameter.

The inventors conducted the test under the conditions that the relationship of $\rho 1 < \rho 2$ was applied to the anode catalyst layer that may be subject to carbon monoxide, and the relationship similar to that of the anode catalyst layer, that is, the relationship that the density $\rho 1c$ of the first catalyst layer portion is smaller than the density $\rho 2c$ of the second catalyst layer portion, was applied to the cathode catalyst layer that is basically not subject to carbon monoxide. The results of the test showed that as the duration of power generation increases, a decrease in power generated by the fuel cell increases.

A second aspect of the invention provides a membrane electrode assembly for a fuel cell. The membrane electrode assembly includes: an ion conducting membrane that has two sides in a thickness direction thereof; a porous anode catalyst layer that is laminated on one side of the ion conducting membrane and that has an anode catalyst that accelerates anode reaction; a porous cathode catalyst layer that is laminated on the other side of the ion conducting membrane and that has a cathode catalyst that accelerates cathode reaction; an anode diffusion layer that is laminated on an outer side of the anode catalyst layer and that allows an anode fluid to pass therethrough; and a cathode diffusion layer that is laminated on an outer side of the cathode catalyst layer and that allows a cathode fluid to pass therethrough. The anode catalyst of the anode catalyst layer contains a poisoning-suppression catalytic component that reduces poisoning of carbon monoxide contained in an anode fluid. The anode catalyst layer includes a first catalyst layer portion and a second catalyst layer portion. The first catalyst layer portion is located closer to the anode diffusion layer than the second catalyst layer portion, and the second catalyst layer portion is located closer to the ion conducting membrane than the first catalyst layer portion. The pore diameter of the first catalyst layer portion is smaller than the pore diameter of the second catalyst layer portion.

According to the above aspect, the anode catalyst of the anode catalyst layer contains a poisoning-suppression catalytic component that reduces poisoning of carbon monoxide contained in an anode fluid. The first catalyst layer portion and the second catalyst layer portion each have a porous structure so as to allow the anode fluid to pass therethrough. The second catalyst layer portion is located closer to the ion conducting membrane than the first catalyst layer portion. Thus, the second catalyst layer portion is able to effectively contribute to power generation reaction at the anode side. Hence, it is undesirable that catalytic activity of the second catalyst layer portion is reduced due to carbon monoxide.

Here, the pore diameter $\phi 1$ of the first catalyst layer portion is smaller than the pore diameter $\phi 2$ of the second catalyst layer portion. Thus, the specific surface of the porous first catalyst layer portion increases as compared with the specific surface of the porous second catalyst layer portion. Hence, even when the duration of service extends over a long period of time, a decrease in power generated by the fuel cell is suppressed.

The reason why a decrease in power generated by the fuel cell is suppressed as described above may be presumed as follows. The pore diameter $\phi 1$ of the porous first catalyst layer portion is smaller than the pore diameter $\phi 2$ of the porous second catalyst layer portion. Thus, the specific surface of the first catalyst layer portion increases as compared with the specific surface of the second catalyst layer portion. For this reason, when an anode fluid is supplied to the anode catalyst layer, in comparison with the case in which the pore diameter $\phi 1$ of the first catalyst layer portion is excessively large, the poisoning-suppression catalytic component contained in the first catalyst layer portion is more likely to contact carbon monoxide contained in the anode fluid. As a result, the poisoning-suppression catalytic component efficiently works. Thus, the first catalyst layer portion has improved capability to reduce poisoning of carbon monoxide contained in a reaction fluid to be supplied to the anode. For this reason, the second catalyst layer portion is more likely to exert an ability to effectively contribute to power generation reaction. Note that the density $\rho 1$ of the first catalyst layer portion may be smaller than or substantially equal to the density $\rho 2$ of the second catalyst layer portion ($\rho 1 < \rho 2$ or $\rho 1 \approx \rho 2$). Within the relationship of $\rho 1 < \rho 2$ or $\rho 1 \approx \rho 2$, $\rho 1/\rho 2$, for example, ranges from 0.1 to less than 1, ranges from 0.2 to 0.9, ranges from 0.3 to 0.7, ranges from 0.7 to 0.8 or ranges from 0.8 to less than 1.

A third aspect of the invention provides a fuel cell. The fuel cell includes: the membrane electrode assembly according to the first aspect or the second aspect; an anode flow distribution member that is located on an outer side of the anode diffusion layer of the membrane electrode assembly and that supplies the anode fluid to the membrane electrode assembly; and a cathode flow distribution member that is located on an outer side of the cathode diffusion layer of the membrane electrode assembly and that supplies the cathode fluid to the membrane electrode assembly. The same function as that of the first aspect or the second aspect may be obtained. Therefore, even when the duration of service extends over a long period of time, a decrease in power generated by the fuel cell is suppressed.

A fourth aspect of the invention provides a fuel cell system. The fuel cell system includes: a reformer that reforms raw fuel into an anode fluid; and the fuel cell according to the third aspect. The fuel cell includes an anode that is supplied with the anode fluid reformed in the reformer; and a cathode that is supplied with the cathode fluid. The same function as that of the first aspect, the second aspect or the third aspect may be obtained. Therefore, even when the duration of service extends over a long period of time, a decrease in power generated by the fuel cell is suppressed.

According to the aspects of the invention, even when the duration of power generation of the fuel cell extends over a long period of time, a decrease in power generated by the fuel cell is suppressed.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

First Embodiment

Figure 1:
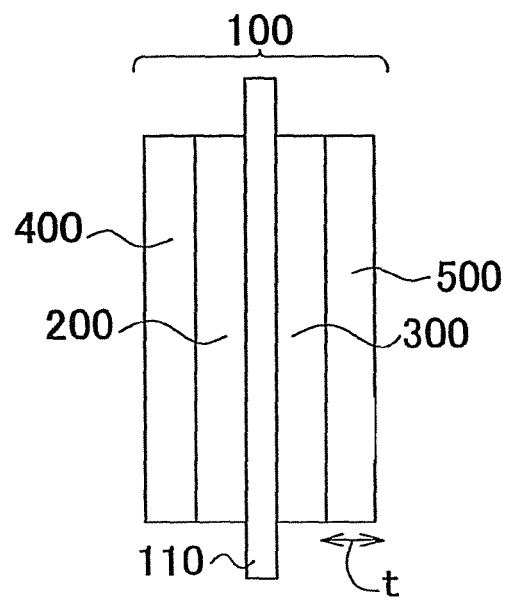
FIG. 1 is a conceptual cross-sectional view that schematically shows an membrane electrode assembly (MEA) according to a first embodiment of the invention.

A membrane electrode assembly (MEA) for a fuel cell includes an anode catalyst layer and a cathode catalyst layer. The anode catalyst layer has an anode catalyst that accelerates anode reaction. The cathode catalyst layer has a catalyst that accelerates cathode reaction. The anode catalyst of the anode catalyst layer contains a poisoning-suppression catalytic component that reduces poisoning of carbon monoxide contained in an anode fluid. The poisoning-suppression catalytic component, for example, includes at least one of ruthenium, tin, osmium, rhodium, palladium, nickel, copper, cobalt, manganese, zinc, iridium, and iron. Thus, the anode catalyst layer contains the poisoning-suppression catalytic component in addition to a regular catalytic component (for example, platinum). Generally, a cathode fluid does not contain carbon monoxide. For this reason, the cathode catalyst of the cathode catalyst layer does not need to contain the poisoning-suppression catalytic component.

According to the first embodiment, the anode catalyst layer includes a first catalyst layer portion located adjacent to an anode diffusion layer and a second catalyst layer portion located adjacent to an ion conducting membrane. In the manufacturing process, it is applicable that the first catalyst layer portion and the second catalyst layer portion are separately formed and, after that, they are laminated and integrated as the anode catalyst layer. Alternatively, it is applicable that, in the manufacturing process, the anode catalyst layer is formed in a monolayer structure and then the side closer to the anode diffusion layer than the second catalyst layer portion is regarded as the first catalyst layer portion and the side closer to the ion conducting membrane than the first catalyst layer portion is regarded as the second catalyst layer portion.

Between the anode catalyst layer and the cathode catalyst layer, only in the anode catalyst layer, the density $\rho1$ of the porous first catalyst layer portion is smaller than the density $\rho2$ of the porous second catalyst layer portion ($\rho1<\rho2$). In this case, $\rho1/\rho2$, for example, ranges from 0.1 to less than 1, ranges from 0.3 to 0.7, or ranges from 0.5 to 0.8. However, $\rho1/\rho2$ is not limited to them. Note that $\rho2$ desirably ranges from 500 to 5000 mg/cm$^3$ and, more desirably, ranges from 1500 to 1700 mg/cm$^3$; however, $\rho2$ is not limited to them.

In the porous anode catalyst layer, $\rho1$ is smaller than $\rho2$, and the specific surface of the first catalyst layer portion increases as compared with the specific surface of the porous second catalyst layer portion.

Generally, as the density of the porous anode catalyst layer increases, the porosity decreases. Conversely, as the density decreases, the porosity increases. Thus, when $\rho1$ is smaller than $\rho2$, where the porosity (pore volume ratio) of the first catalyst layer portion is $\lambda1$ and the porosity of the second catalyst layer portion is $\lambda2$, the porosity $\lambda1$ of the first catalyst layer portion is higher than the porosity $\lambda2$ of the second catalyst layer portion ($\lambda1>\lambda2$). Generally, when $\rho1$ is larger than $\rho2$, $\lambda1$ is lower than $\lambda2$.

Figure 2:
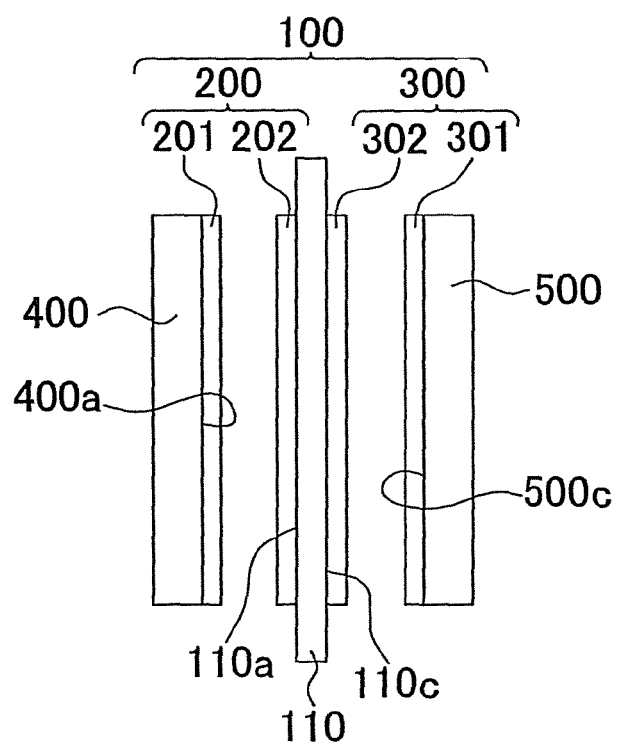
FIG. 2 is a conceptual cross-sectional view that schematically shows a process of manufacturing the MEA according to the first embodiment of the invention.
Figure 3:
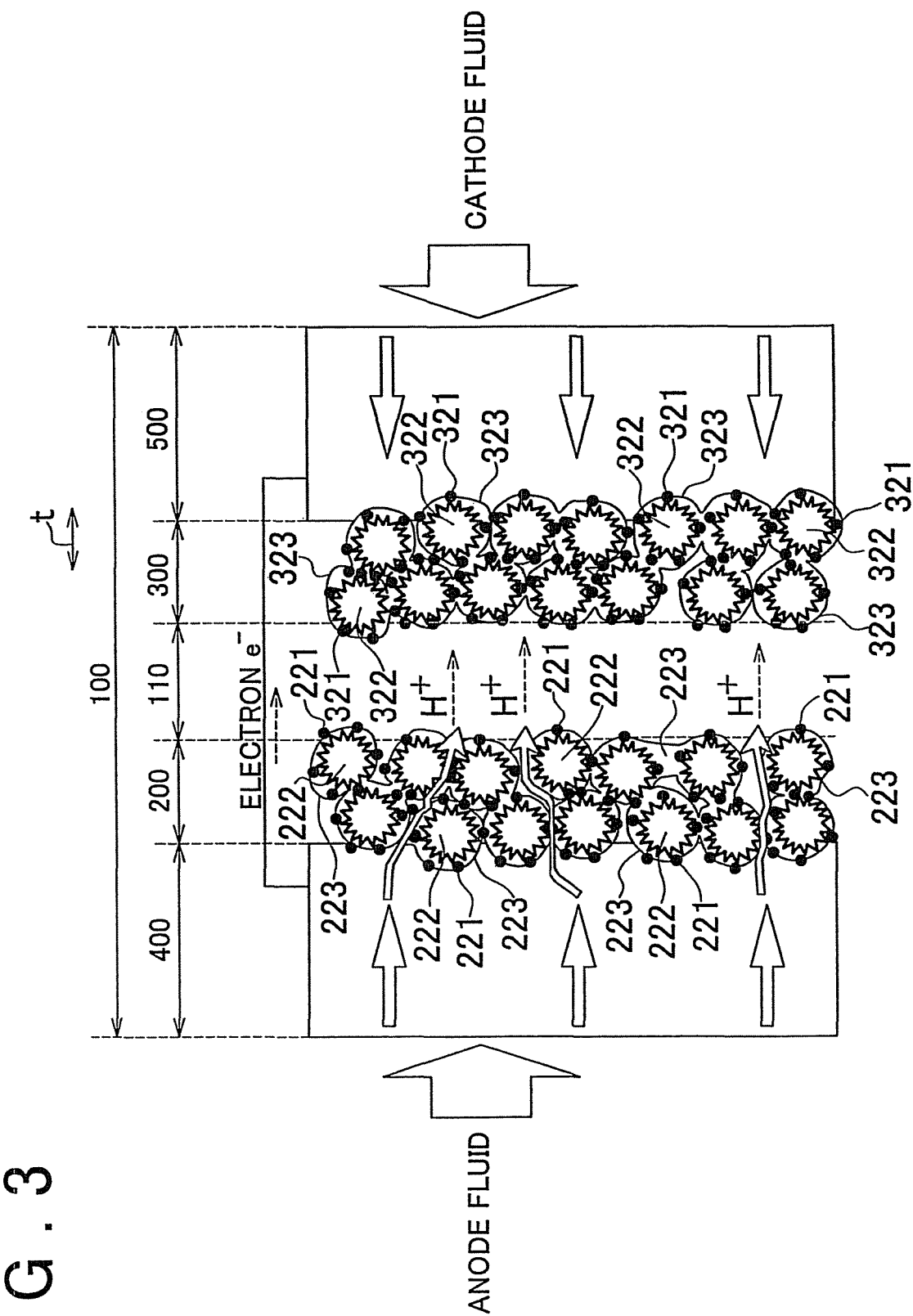
FIG. 3 is a conceptual cross-sectional view that schematically shows the internal structure of the MEA according to the first embodiment of the invention.

Hereinafter, the first embodiment will be described in greater detail with reference to the accompanying drawings. FIG. 1 is a conceptual view of an membrane electrode assembly (MEA) 100 according to the first embodiment. FIG. 2 is a conceptual view of a process of manufacturing the MEA 100. FIG. 3 is a conceptual view of the internal structure of the MEA 100. As shown in FIG. 1, the MEA 100 includes an ion conducting membrane 110, a porous anode catalyst layer 200, a porous cathode catalyst layer 300, an anode diffusion layer 400, and a cathode diffusion layer 500. The ion conducting membrane 110 is made of a fluorocarbon-based solid polymer material (for example, perfluorosulfonate resin) or a hydrocarbon-based solid polymer material, and has a thickness of, for example, 20 to 50 μm. The ion conducting membrane 110 has two sides (faces) in the thickness direction (arrow t direction). The anode catalyst layer 200 is located on one side of the ion conducting membrane 110, and has a thickness of, for example, 5 to 15 μm. The cathode catalyst layer 300 is located on the other side of the ion conducting membrane 110, and has a thickness of, for example, 5 to 15 μm. The anode diffusion layer 400 is located on the outer side of the anode catalyst layer 200. The cathode diffusion layer 500 is located on the outer side of the cathode catalyst layer 300. Here, the thickness of the ion conducting membrane 110 is, for example, smaller than or equal to 80 μm and, more specifically, ranges from 20 to 50 μm. The thickness of the anode catalyst layer 200 is, for example, smaller than or equal to 50 μm and, more specifically, ranges from 5 to 15 μm. The thickness of the cathode catalyst layer 300 is, for example, 50 μm and, more specifically, ranges from 5 to 15 μm. However, the thicknesses are not limited to the above described values.

The anode diffusion layer 400 desirably allows an anode fluid (anode gas) to permeate therethrough, and is desirably formed of a porous fiber-accumulated body, which is formed of fibers such as conductive fibers, or a porous foam. The cathode diffusion layer 500 desirably allows a cathode fluid (cathode gas) to permeate therethrough, and is desirably formed of a porous fiber-accumulated body, which is formed of fibers such as conductive fibers, or a porous foam. The conductive fiber is, for example, a carbon fiber.

As shown in FIG. 3, the ion conducting membrane 110 is a solid polymer electrolyte and has an ion conducting property (proton conducting property). The anode catalyst layer 200 includes an anode catalyst 221 (for example, noble metal catalyst) that accelerates anode reaction, a conductive carrier 222 that supports the anode catalyst 221, and an ion conducting material 223. The anode catalyst layer 200 has a porous structure and has a large number of pores that allow anode gas (for example, hydrogen gas or gas containing hydrogen) as an anode fluid to pass therethrough. The cathode catalyst layer 300 includes a cathode catalyst 321 (for example, platinum) that accelerates cathode reaction, a conductive carrier 322 that supports the cathode catalyst 321, and an ion conducting material 323. The cathode catalyst layer 300 has a porous structure and has a large number of pores that allow cathode gas (for example, gas containing oxygen, such as air) as a cathode fluid to pass therethrough. The carrier is, for example, conductive carbon-based microcarriers, such as carbon black. The carbon black is, for example, acetylene black, furnace black, lamp black, or thermal black. The carrier may be a conductive fiber such as a carbon nanofiber or a carbon fiber. The microcarriers may be agglomerated.

As described above, the components that constitute the anode catalyst layer 200 include the catalyst, the carrier that supports the catalyst, and the ion conducting material. Similarly, the components that constitute the cathode catalyst layer 300 include the catalyst, the carrier that supports the catalyst, and the ion conducting material. The ion conducting material (proton conducting material) may be a fluorocarbon-based material or a hydrocarbon-based material. The fluorocarbon-based material, for example, has a perfluoroalkylene group as a principal chain skeleton and a functional group, such as a sulfonic acid group, as a side chain of perfluorovinylether. The anode catalyst layer 200 and the cathode catalyst layer 300 employ the same type of carrier and the same type of ion conducting material. Thus, the difference between the anode catalyst layer 200 and the cathode catalyst layer 300 is that the catalyst of the anode catalyst layer 200, which may be subject to carbon monoxide, contains the following poisoning-suppression catalytic component, whereas the catalyst of the cathode catalyst layer 300, which is basically not subject to carbon monoxide, does not contain the poisoning-suppression catalytic component.

Here, in the anode catalyst layer 200 (see FIG. 2, which will be described later), if the solid content that constitutes a first catalyst layer portion 201 is 100 percent by mass, the composition of the solid content is, for example, such that the sum of the catalyst and the carrier ranges from 50 to 80 percent by mass or ranges from 60 to 70 percent by mass and the ion conducting material ranges from 20 to 50 percent by mass or ranges from 30 to 40 percent by mass. On the other hand, if the solid content that constitutes the second catalyst layer portion 202 is 100 percent by mass, the composition of the solid content is, for example, such that the sum of the catalyst and the carrier ranges from 50 to 80 percent by mass or ranges from 60 to 70 percent by mass and the ion conducting material ranges from 20 to 50 percent by mass or ranges from 30 to 40 percent by mass.

The anode fluid (anode gas) may contain carbon monoxide (poisoning material). There is a possibility that carbon monoxide may reduce catalytic activity of the electrode catalyst (for example, platinum or palladium). For this reason, the anode catalyst 221 in the anode catalyst layer 200 contains the poisoning-suppression catalytic component that is able to reduce poisoning of carbon monoxide. The poisoning-suppression catalytic component desirably removes carbon monoxide by oxidizing the carbon monoxide. Instead, the poisoning-suppression catalytic component just needs to reduce poisoning of carbon monoxide through another mechanism.

The above poisoning-suppression catalytic component, for example, includes at least one of ruthenium, tin, osmium, rhodium, palladium, nickel, copper, cobalt, manganese, zinc, iridium, and iron. Thus, the anode catalyst 221 compounded into the anode catalyst layer 200 contains the above described poisoning-suppression catalytic component and platinum. In this case, the poisoning-suppression catalytic component and platinum may be present one by one, or may be alloyed.

As shown in FIG. 2, the anode catalyst layer 200 includes the porous first catalyst layer portion 201 laminated on the surface 400a of the anode diffusion layer 400 and the porous second catalyst layer portion 202 laminated on the surface 110a of the ion conducting membrane 110. Here, the density ρ1 of the first catalyst layer portion 201 is smaller than the density ρ2 of the second catalyst layer portion 202 (ρ1<ρ2). In this case, ρ1/ρ2 ranges from 0.1 to less than 1, ranges from 0.2 to 0.9 and, more specifically, ranges from 0.3 to 0.7. However, ρ1/ρ2 is not limited to them. ρ2 ranges from about 500 to about 5000 mg/cm$^3$, ranges from about 1000 to about 3000 mg/cm$^3$ and, furthermore, ranges from about 1500 to 1700 mg/cm$^3$.

Generally, as the density of the anode catalyst layer 200 increases, the porosity decreases. Conversely, as the density decreases, the porosity increases. Thus, where the porosity of the first catalyst layer portion 201 is λ1 and the porosity of the second catalyst layer portion 202 is λ2, the porosity λ1 of the first catalyst layer portion 201 is higher than the porosity λ2 of the second catalyst layer portion 202 (λ1>λ2).

The first catalyst layer portion 201 is desirably formed by spray coating, pore-forming agent addition, or fiber blending-in-order to decrease the density of the first catalyst layer portion 201. The second catalyst layer portion 202 is formed by applicator coating in order to keep the density of the second catalyst layer portion 202. In this way, the first catalyst layer portion 201 and the second catalyst layer portion 202, for example, have the same or approximate compositions while the coating methods are varied from each other.

Here, where the diameter of a pore formed in the first catalyst layer portion 201 is φ1 and the diameter of a pore formed in the porous second catalyst layer portion 202 is φ2, φ1 is smaller than φ2 (φ1<φ2). φ1/φ2, for example, ranges from about 0.3 to about 0.8 and, more specifically, ranges from about 0.4 to about 0.7. Here, while φ1 is smaller than φ2, φ2, for example, ranges from 30 to 100 nm, ranges from 40 to 90 nm and, furthermore, ranges from 50 to 70 nm. The pore diameter in the embodiments and examples may be based on a median diameter measured by a mercury porosimeter.

As described above, according to the present embodiment, because the density of the anode catalyst layer 200 is set to the relationship that ρ1 is smaller than ρ2, the specific surface of the porous first catalyst layer portion 201 increases as compared with the specific surface of the porous second catalyst layer portion 202. Furthermore, the pore diameter is set to the relationship that φ1 is smaller than φ2. Thus, the specific surface of the porous first catalyst layer portion 201 further increases as compared with the specific surface of the porous second catalyst layer portion 202.

Thus, when an anode fluid is supplied to the anode catalyst layer 200, in comparison with the case in which the density of the first catalyst layer portion 201 is large, the poisoning-suppression catalytic component contained in the first catalyst layer portion 201 is more likely to contact carbon monoxide in the anode fluid that flows a gas passage (fluid passage) of the first catalyst layer portion 201. Furthermore, because the density of the second catalyst layer portion 202 is larger than the density of the first catalyst layer portion 201, it can also be expected to restrict circulation of carbon monoxide contained in the anode fluid. As a result, in comparison with the case in which the density of the first catalyst layer portion 201 is large, the first catalyst layer portion 201 has improved capability to reduce poisoning of carbon monoxide contained in the anode fluid.

Thus, at the time when the anode fluid reaches the second catalyst layer portion 202 via the first catalyst layer portion 201, poisoning of carbon monoxide is reduced. For this reason, catalyst activity in the second catalyst layer portion 202 that effectively contributes to power generation reaction is desirably exerted. Hence, even when the duration of service extends over a long period of time, a decrease in power generated by the fuel cell is suppressed.

The cathode catalyst layer 300 will be described. The cathode catalyst layer 300 is formed by applicator coating, and includes a porous first cathode catalyst layer portion 301 laminated on the surface 500c of the cathode diffusion layer 500 and a porous second cathode catalyst layer portion 302 laminated on the surface 110c of the ion conducting membrane 110. In the cathode catalyst layer 300, the density $\rho 1c$ of the first catalyst layer portion 301 is not purposely varied from the density $\rho 2c$ of the second catalyst layer portion 302, and the densities of both are basically about the same, $\rho 1c/\rho 2c$ ranges from 0.85 to 1.15 and, more specifically, ranges from 0.95 to 1.05. In addition, the pore diameter $\phi 1c$ of the first catalyst layer portion 301 is not purposely varied from the pore diameter $\phi 2c$ of the second catalyst layer portion 302, and the pore diameters of them are basically about the same. $\phi 1c/\phi 2c$ ranges from 0.85 to 1.15 and, more specifically, ranges from 0.95 to 1.05.

Second Embodiment

According to a second embodiment of the invention, between the anode catalyst layer and the cathode catalyst layer, where, in the anode catalyst layer only, the pore diameter $\phi 1$ of the porous first catalyst layer portion is smaller than the pore diameter $\phi 2$ of the porous second catalyst layer portion $\phi 1 < \phi 2$). $\phi 2$ desirably ranges from 30 to 100 nm, ranges from 40 to 90 nm and, furthermore, ranges from 50 to 70 nm. The ratio of pore diameters $\phi 1/\phi 2$ desirably ranges from 0.1 to less than 1, ranges from 0.2 to 0.95, ranges from 0.3 to 0.95, ranges from 0.4 to 0.95 and, furthermore, ranges from 0.5 to 0.9. Note that the pore diameter may be based on a median diameter measured by a mercury porosimeter; instead, it may be based on a mode diameter (most frequent diameter).

The illustrated first catalyst layer portion of the anode catalyst layer has a small density owing to at least one of spray coating in which catalyst ink (catalyst paste) is applied by spraying, pore-forming agent addition in which pore-forming agent is added to the first catalyst layer portion, or a structure that the first catalyst layer portion incorporates microfibers. Spray coating can increase micropores in comparison with applicator coating, and it is advantageous in decreasing the density of the porous first catalyst layer portion. When pore-forming agent is added at the time of manufacturing the first catalyst layer portion, pores owing to the pore-forming agent are formed in the first catalyst layer portion. Thus, it is advantageous in decreasing the density of the porous first catalyst layer portion.

The pore-forming agent is, for example, a material, such as polyvinyl alcohol, that dissolves in water or a material, such as pulp, that is burnt, evaporated, or liquefied by heating. If microfibers are contained in the first catalyst layer portion, it is easy to decrease the density of the porous first catalyst layer portion. The length of a microfiber, for example, ranges from 1 to 300 µm, ranges from 2 to 100 µm and, more specifically, ranges from 5 to 50 µm. The microfiber is desirably conductive, and is, for example, carbon nanotube (including carbon nanohorn) or carbon nanofiber.

When the anode fluid that contains carbon monoxide (poisoning material) flows through the anode catalyst layer, an anode active material (for example, hydrogen) contained in the anode fluid is progressively consumed for power generation reaction as it is transferred toward the downstream side. Thus, the concentration of anode active material (for example, hydrogen) is gradually reduced from the upstream side of the anode catalyst layer toward the downstream side thereof. This means that the concentration of carbon monoxide gradually increases from the upstream side of the anode catalyst layer toward the downstream side thereof and, therefore, the poisoning is more likely to occur at the downstream side of the anode catalyst layer than at the upstream side thereof. Then, in the illustrated anode catalyst layer, the amount of poisoning-suppression catalytic component supported per unit area, which reduces poisoning of carbon monoxide contained in an anode fluid, is greater at the downstream side than at the upstream side. That is, in the anode catalyst layer, the anode fluid flows from the upstream side toward the downstream side, and in the illustrated anode catalyst layer, the amount of poisoning-suppression catalytic component supported per unit area is increased at the upstream side as compared with at the downstream side. Note that the upstream side indicates an inlet side region of the anode fluid and indicates a relative region in a direction in which the anode fluid flows. The downstream side indicates an outlet side region of the anode fluid and indicates a relative region in a direction in which the anode fluid flows.

Hereinafter, the second embodiment will be described in detail with reference to the accompanying drawings. The present embodiment basically has a similar configuration, function and advantageous effects to those of the first embodiment, so FIG. 1 and FIG. 2 are also used for reference. Hereinafter, different portions will be mainly described. The density $\rho 1$ of the porous first catalyst layer portion 201 is smaller than the density $\rho 2$ of the porous second catalyst layer portion 202 ($\rho 1 < \rho 2$). $\rho 2$ may range from 500 to 5000 mg/cm$^3$ and, more specifically, may range from 1500 to 1700 mg/cm$^3$. The pore diameter $\phi 1$ of the first catalyst layer portion 201 is substantially equal to the pore diameter $\phi 2$ of the porous second catalyst layer portion 202 ($\phi 1 \approx \phi 2$). Here, $\phi 1/\phi 2$ ranges from 0.85 to 1.15. $\phi 2$ may range from 30 to 100 nm and, furthermore, may range from 50 to 70 nm. The pore diameter may be based on a median diameter.

In the present embodiment as well, as in the case of the first embodiment, the density of the anode catalyst layer 200 is set to the relationship that $\rho 1$ is smaller than $\rho 2$. Thus, the poisoning-suppression catalytic component contained in the first catalyst layer portion 201 is more likely to contact carbon monoxide in the anode fluid that flows through the fluid passage of the first catalyst layer portion 201. As a result, in comparison with the case in which the density of the first catalyst layer portion 201 is large, the first catalyst layer portion 201 has improved capability to reduce poisoning of carbon monoxide contained in the anode fluid. Thus, poisoning of carbon monoxide is reduced in the second catalyst layer portion 202. For this reason, the second catalyst layer portion 202 is more likely to exert an ability to effectively contribute to power generation reaction. Hence, even when the duration of service extends over a long period of time, a decrease in power generated by the fuel cell is suppressed.

Furthermore, the cathode catalyst layer 300 will be described. The cathode catalyst layer 300 is formed not by spray coating but by applicator coating, and includes the porous first catalyst layer portion 301 located adjacent to the cathode diffusion layer 500 and the porous second catalyst layer portion 302 located adjacent to the ion conducting membrane 110. In the cathode catalyst layer 300, the density $\rho 1c$ of the first catalyst layer portion 301 is not purposely varied from the density $\rho 2c$ of the second catalyst layer portion 302, and the densities of both are basically about the same. Thus, $\rho 1c/\rho 2c$ ranges from 0.85 to 1.15. Note that the pore diameter of the first catalyst layer portion 301 is not purposely varied from the pore diameter of the second catalyst layer portion 302, and the pore diameters of them are basically about the same. Thus, $\phi 1c/\phi 2c$ ranges from 0.85 to 1.15. The pore diameter may be based on a median diameter.

Third Embodiment

The present embodiment basically has a similar configuration, function and advantageous effects to those of the first embodiment. Hereinafter, different portions will be mainly described, so FIG. 1 and FIG. 2 are also used for reference. Here, in the anode catalyst layer 200, the pore diameter $\phi 1$ of the porous first catalyst layer portion 201 is smaller than the pore diameter $\phi 2$ of the porous second catalyst layer portion 202 ($\phi 1<\phi 2$), $\phi 1/\phi 2$ ranges from 0.5 to 0.85. $\phi 2$ may range from 30 to 100 nm and, furthermore, may range from 50 to 70 nm. The pore diameter may be based on a median diameter. Note that the density $\rho 1$ of the first catalyst layer portion 201 is substantially equal to the density $\rho 2$ of the second catalyst layer portion 202. Specifically, $\rho 1/\rho 2$ ranges from 0.95 to 1.05 ($\rho 1 \approx \rho 2$). Here, $\rho 2$ may range from 500 to 5000 mg/cm$^3$ and, more specifically, may range from 1500 to 1700 mg/cm$^3$. Furthermore, the porosity $\lambda 1$ of the first catalyst layer portion 201 is substantially equal to the porosity $\lambda 2$ of the second catalyst layer portion 202 ($\lambda 1/\lambda 2$ ranges from 0.95 to 1.05, $\lambda 1 \approx \lambda 2$).

According to the present embodiment, the pore diameter of the porous anode catalyst layer 200 is set to the relationship that $\phi 1$ is smaller than $\phi 2$ as described above. Thus, the specific surface of the porous first catalyst layer portion 201 increases as compared with the specific surface of the porous second catalyst layer portion 202. As a result, in comparison with the case in which the pore diameter of the first catalyst layer portion 201 is large and the specific surface thereof is small, the poisoning-suppression catalytic component contained in the first catalyst layer portion 201 is more likely to contact carbon monoxide in the anode fluid that flows through the fluid passage of the first catalyst layer portion 201. Thus, poisoning of carbon monoxide is reduced in the second catalyst layer portion 202. For this reason, the second catalyst layer portion 202 is more likely to exert an ability to effectively contribute to power generation reaction and, therefore, a decrease in power generated by the fuel cell is suppressed.

According to the present embodiment, the cathode catalyst layer 300 is formed not by spray coating but by applicator coating, and includes the porous first catalyst layer portion 301 located adjacent to the cathode diffusion layer 500 and the porous second catalyst layer portion 302 located adjacent to the ion conducting membrane 110. In the cathode catalyst layer 300, the density $\rho 1c$ of the first catalyst layer portion 301 is not purposely varied from the density $\rho 1c$ of the second catalyst layer portion 302, and the densities of both are basically about the same. Thus, $\rho 1c/\rho 2c$ ranges from 0.85 to 1.15. $\rho 2$ may range from 500 to 5000 mg/cm$^3$ and, more specifically, may range from 1900 to 2100 mg/cm$^3$.

Furthermore, the pore diameter of the first catalyst layer portion 301 is not purposely varied from the pore diameter of the second catalyst layer portion 302, and the pore diameters of them are basically about the same ($\phi 1c \approx \phi 2c$). $\phi 1c/\phi 2c$ ranges from 0.85 to 1.15. The pore diameter may be based on a median diameter.

A manufacturing method will be specifically described in fourth and fifth embodiments.

Fourth Embodiment

Figure 4:
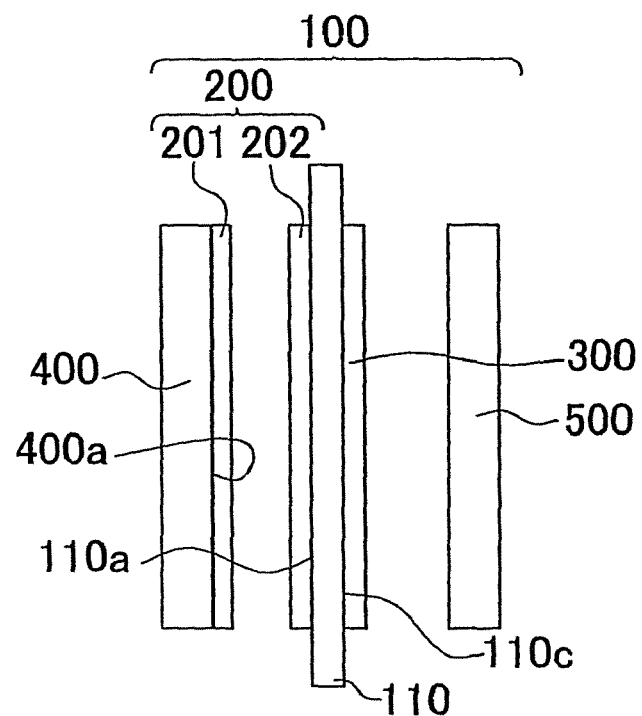
FIG. 4 is a conceptual cross-sectional view that schematically shows a process of manufacturing the MEA according to a fourth embodiment of the invention.

FIG. 4 shows the fourth embodiment. The present embodiment basically has a similar configuration, function and advantageous effects to those of the first embodiment. Hereinafter, different portions will be mainly described. According to the present embodiment, as is different from the first embodiment, the cathode catalyst layer 300 that is not subject to carbon monoxide is formed but not by laminating the first catalyst layer portion 301 and the second catalyst layer portion 302. The cathode catalyst layer 300 is formed as a monolayer on the surface 110c of the ion conducting membrane 110, facing the cathode diffusion layer 500, in the manufacturing process. In this state, the MEA 100 is integrated by hot pressing. Because the cathode catalyst layer 300 is a monolayer in the manufacturing process, an excessive thickness may be suppressed. Although the cathode catalyst layer 300 is a monolayer in the manufacturing process, in the bonded and complete membrane electrode assembly 100, the cathode catalyst layer 300 may be regarded separately as the first catalyst layer portion 301 located close to the ion conducting membrane 100 and the second catalyst layer portion 302 located close to the cathode diffusion layer 500.

Fifth Embodiment

Figure 5:
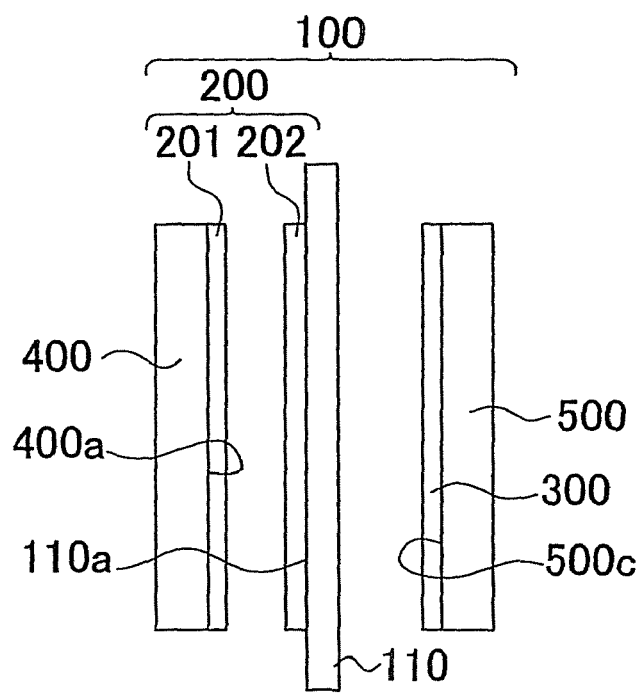
FIG. 5 is a conceptual cross-sectional view that schematically shows a process of manufacturing the MEA according to a fifth embodiment of the invention.

FIG. 5 shows the fifth embodiment. The present embodiment basically has a similar configuration, function and advantageous effects to those of the first embodiment. Hereinafter, different portions will be mainly described. The fifth embodiment differs from the first embodiment in that the cathode catalyst layer 300 is formed but not by laminating the first catalyst layer portion 301 and the second catalyst layer portion 302. In the manufacturing process, the cathode catalyst layer 300 is formed as a monolayer on the surface 500c of the cathode diffusion layer 500, facing the ion conducting membrane 110. In this state, the MEA 100 is integrated by hot pressing. Because the cathode catalyst layer 300 is a monolayer in the manufacturing process, an excessive thickness may be suppressed.

The distribution of the amount of ruthenium in the anode catalyst layer will be described in sixth to eighth embodiments.

Sixth Embodiment

Figure 6:
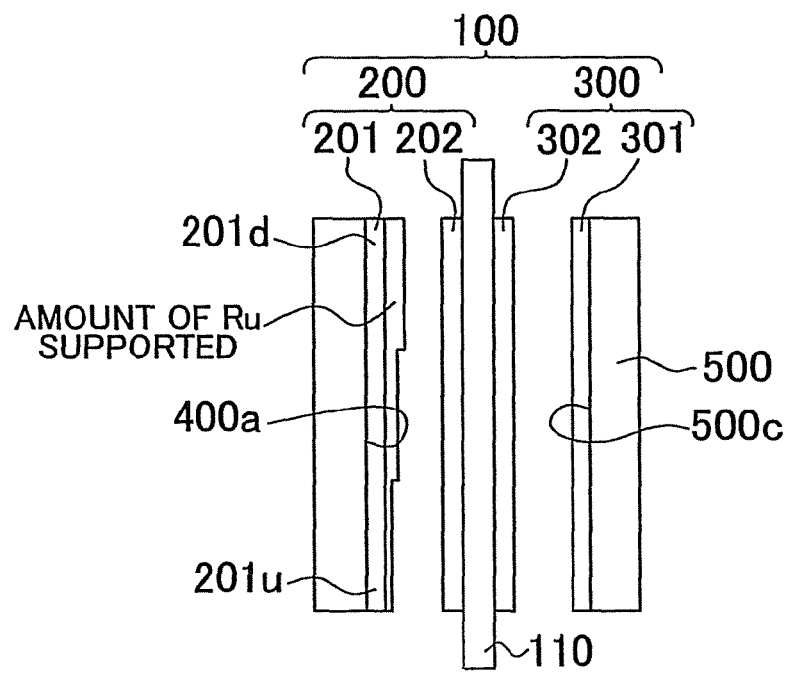
FIG. 6 is a conceptual cross-sectional view that schematically shows a process of manufacturing the MEA according to a sixth embodiment of the invention.

FIG. 6 shows the sixth embodiment. The present embodiment basically has a similar configuration, function and advantageous effects to those of the first embodiment. Hereinafter, different portions will be mainly described. When a gaseous anode fluid that contains carbon monoxide flows through the anode catalyst layer 200, an anode active material (hydrogen) contained in the anode fluid is progressively consumed for power generation reaction. Thus, the concentration of anode active material (hydrogen) is gradually reduced from the upstream side of the anode catalyst layer 200 toward the downstream side thereof. This means that the concentration of carbon monoxide gradually increases from the upstream side of the anode catalyst layer 200 toward the downstream side thereof. Thus, it is desirable to take measures against poisoning at the downstream side of the anode catalyst layer 200. According to the present embodiment, in the first catalyst layer portion 201 that constitutes the anode catalyst layer 200, the amount of the above described poisoning-suppression catalytic component (for example, ruthenium) supported gradually increases from an upstream side 201u toward a downstream side 201d. That is, the amount of poisoning-suppression catalytic component (for example, ruthenium) supported is greater at the downstream side 201d than at the upstream side 201u. In FIG. 6, the amount of poisoning-suppression catalytic component (for example, ruthenium) supported is schematically shown in a stepwise manner.

In contrast, in the second catalyst layer portion 202, the amount of poisoning-suppression catalytic component (for example, ruthenium) per unit area (mass per unit area) is substantially equal from an upstream side 202u toward a downstream side 202d. The "substantially equal" means that the ratio of the amount of poisoning-suppression catalytic component (for example, ruthenium) supported per unit area (downstream side/upstream side) ranges from 0.9 to 1.1 and, more specifically, ranges from 0.95 to 1.05.

According to the present embodiment as described above, in the first catalyst layer portion 201 to which an anode fluid is supplied prior to the second catalyst layer portion 202, the amount of the above described poisoning-suppression catalytic component (for example, ruthenium) supported per unit area is greater at the downstream side 201d than at the upstream side 201u. Thus, it is advantageous in suppressing poisoning of carbon monoxide.

Seventh Embodiment

Figure 7:
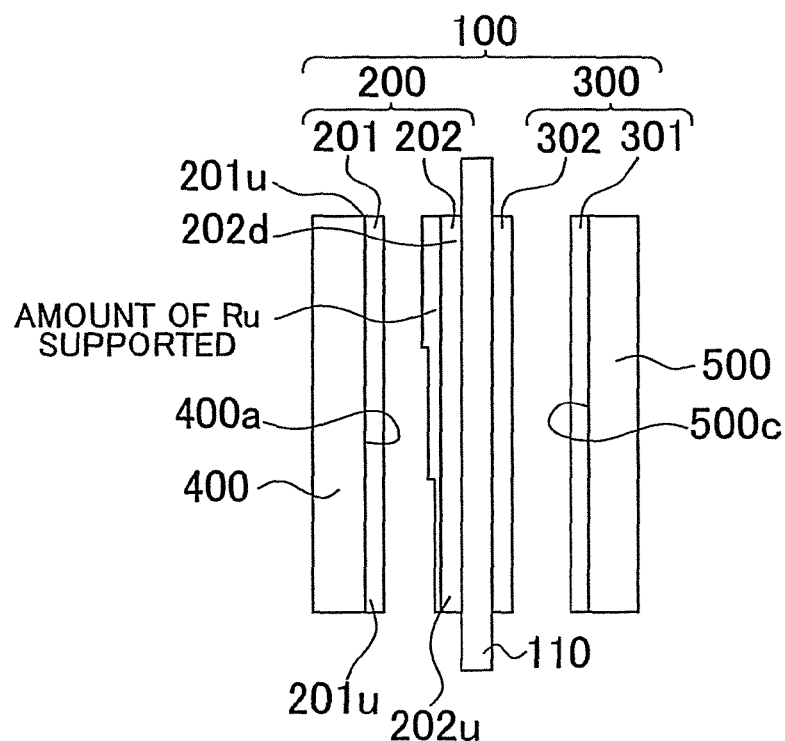
FIG. 7 is a conceptual cross-sectional view that schematically shows a process of manufacturing the MEA according to a seventh embodiment of the invention.

FIG. 7 shows the seventh embodiment. The present embodiment basically has a similar configuration, function and advantageous effects to those of the sixth embodiment. Hereinafter, different portions will be mainly described. According to the present embodiment, in the second catalyst layer portion 202 that constitutes the anode catalyst layer 200, the amount of the above described poisoning-suppression catalytic component (for example, ruthenium) supported per unit area gradually increases from the upstream side 202u toward the downstream side 202d. In the first catalyst layer portion 201, the amount of poisoning-suppression catalytic component (for example, ruthenium) supported is substantially equal from the upstream side 201u toward the downstream side 201d. The "substantially equal" means that the ratio (mass ratio) of the amount of poisoning-suppression catalytic component (for example, ruthenium) supported per unit area (downstream side/upstream side) ranges from 0.9 to 1.1 and, more specifically, ranges from 0.95 to 1.05. According to the present embodiment as described above, in the second catalyst layer portion 202 that is located close to the ion conducting membrane 110 and that largely contributes to power generation reaction, the amount of the above described poisoning-suppression catalytic component (for example, ruthenium) supported is greater at the downstream side 202d than at the upstream side 202u. Thus, it is advantageous in suppressing poisoning of carbon monoxide.

Eighth Embodiment

Figure 8:
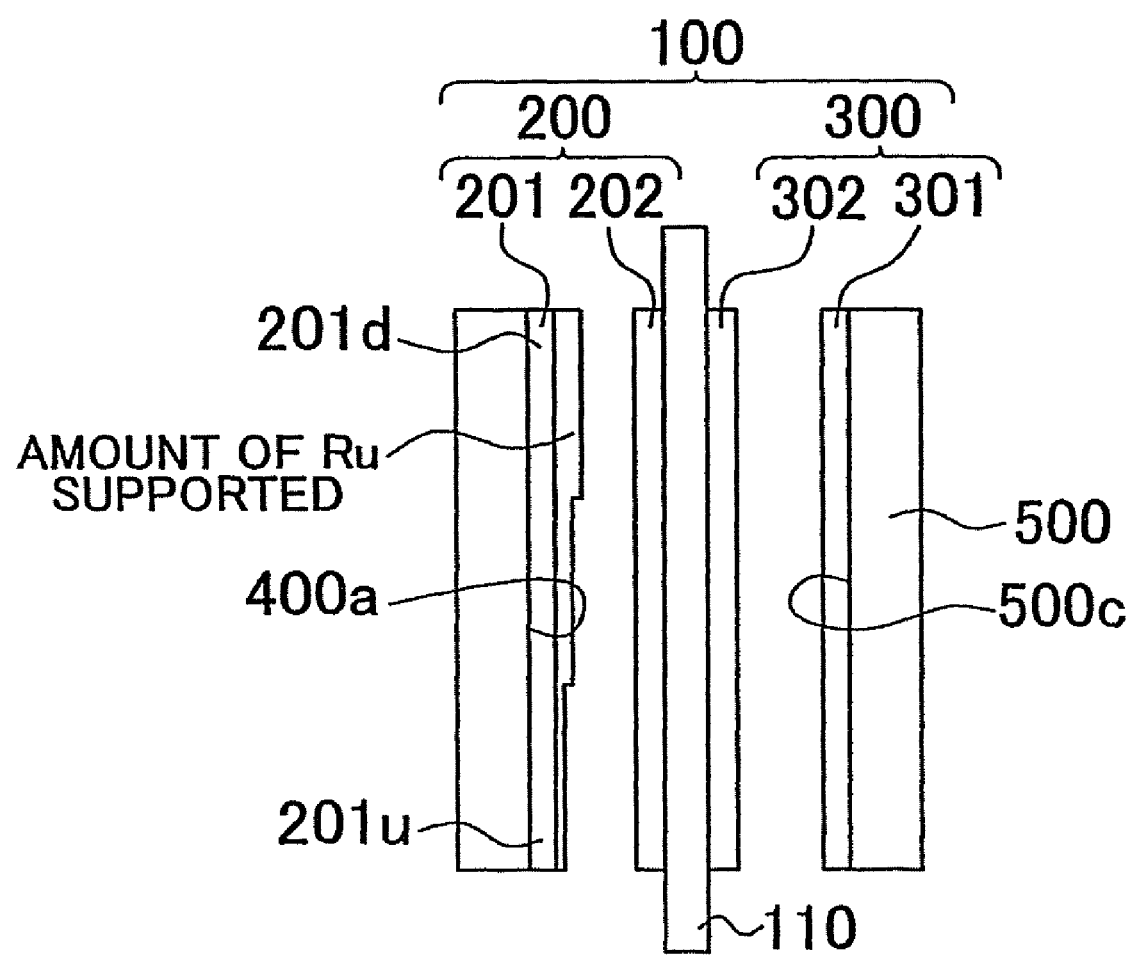
FIG. 8 is a conceptual cross-sectional view that schematically shows a process of manufacturing the MEA according to an eighth embodiment of the invention.

FIG. 8 shows the eighth embodiment. The present embodiment basically has a similar configuration, function and advantageous effects to those of the sixth embodiment shown in FIG. 6. Thus, $\rho 1$ is smaller than $\rho 2$. Hereinafter, different portions will be mainly described. In the first catalyst layer portion 201 that constitutes the anode catalyst layer 200, the amount of the above described poisoning-suppression catalytic component (for example, ruthenium) supported gradually increases from the upstream side 201u toward the downstream side 201d. In addition, in the first catalyst layer portion 201, the density $\rho 1u$ of the upstream side 201u is slightly smaller than the density $\rho 1d$ of the downstream side 201d. $\rho 1u/\rho 1d$ substantially ranges from 0.8 to 0.97. The pore diameter $\phi 1u$ of the upstream side 201u is substantially equal to the pore diameter $\phi 1d$ of the downstream side 201d. In the present embodiment as well, it is advantageous in suppressing poisoning of carbon monoxide.

Hereinafter, examples will be described together with comparative examples.

Catalyst Ink Formation

Catalyst ink used in examples and in comparative examples will be described. First, a mixture for anode was dispersed by a homogenizer through bead milling to form anode catalyst ink. The mixture contained 6 g of catalyst-supporting carbon particles (Tanaka Kikinzoku Kogyo K. K., Product Name: TEC62E58) that supports an anode catalyst on a carbon carrier (carbon black), 16 g of solution that contains 20 percent by mass of ion conducting material (Du Pont, Nafion™), 23 g of ethanol (dispersion medium), and 55 g of distilled water (dispersion medium). If the anode catalyst-supporting carbon is 100 percent by mass, the composition was 28 percent by mass of platinum, 29 percent by mass of ruthenium, and the remainder carbon. Thus, the amount of platinum and the amount of ruthenium were substantially equal. Ruthenium facilitates oxidization of carbon monoxide contained in the anode gas.

A mixture for cathode was dispersed by a homogenizer through bead milling to form cathode catalyst ink. The mixture contained 14 g of catalyst-supporting carbon particles (Tanaka Kikinzoku Kogyo K. K., Product Name: TEC62E58) that supports a cathode catalyst on a carbon carrier (carbon black), 15 g of solution that contains 20 percent by mass of ion conducting material (Nafion™), 26 g of ethanol (dispersion medium), and 45 g of distilled water (dispersion medium). If the cathode catalyst-supporting carbon is 100 percent by mass, the composition was 70 percent by mass of platinum and the remainder carbon. Ruthenium was not substantially contained therein. As described above, the components of the anode catalyst ink and the components of the cathode catalyst ink are almost the same except-ruthenium. Note that after the catalyst layers are formed, ethanol and distilled water evaporate.

(1) First Example (1-1) Formation of First Catalyst Layer Portion 201 of Anode Catalyst Layer 200

The anode diffusion layer 400 employed commercially-available carbon paper (Toray Industries, Inc., 200 μm in thickness). Then, the anode catalyst ink was applied on the surface 400a of the anode diffusion layer 400, facing the ion conducting membrane 110, with a spray coater to thereby form the first catalyst layer portion 201. Spray coating increases the porosity of the first catalyst layer portion 201 in order to decrease the density of the first catalyst layer portion 201. The spray coating was performed with a nozzle aperture of 1.0 mm, at a height of 85 mm and at an atomization pressure of 0.3 MPa. In this case, in the first catalyst layer portion 201, the amount of platinum (Pt) supported was 0.2 mg Pt/cm$^2$, and the amount of ruthenium (Ru) supported was 0.2 mg Ru/cm$^2$. In the coated first catalyst layer portion 201, the density of platinum was 150 mg Pt/cm³ on average, and the density of ruthenium was 150 mg Ru/cm³ on average. In the first catalyst layer portion 201, the density ρ1 was 830 mg/cm³, and the pore diameter φ1 was 42 nm. The pore diameter was based on a median diameter. The density ρ1 was obtained as follows. The difference in weight (coated amount) between before and after coating the anode first catalyst layer portion 201 was measured. Next, the difference in weight (coated amount) was converted into the weight per unit area of the first catalyst layer portion 201 (0.2 mg Pt/cm²). The density (150 mg Pt/cm³) was calculated from the thickness observed with an SEM. The calculated density was converted into a solid content density (150 mg Pt/cm³÷0.18≈830 mg/cm³) using the ratio of Pt to solid content (≈18 percent by mass). Note that ethanol and distilled water evaporate, so they were not included in the mass of the catalyst layer portions 201 and 202.

(1-2) Formation of Second Catalyst Layer Portion 202 of Anode Catalyst Layer 200

The anode catalyst ink was applied on the surface of a Teflon sheet (fluororesin sheet) with an applicator coater to thereby form the second catalyst layer portion 202. Applicator coating is to ensure the porosity of the second catalyst layer portion 202 while the density of the second catalyst layer portion 202 is larger than the density ρ1 of the first catalyst layer portion 201. The applicator coating was performed with a gap of 200 μm set between the applicator blade and the Teflon sheet. In this case, in the second catalyst layer portion 202, the amount of platinum supported was 0.2 mg Pt/cm², and the amount of ruthenium supported was 0.2 mg Ru/cm². The second catalyst layer portion 202 applied on the Teflon sheet as described above was transferred to the surface 110a of one side of the ion conducting membrane 110 (thickness: 30 μm). The transfer was performed at a temperature of 150° C. and at a pressure of 8 MPa. The conditions of the transfer are not limited to them.

Here, in the second catalyst layer portion 202 transferred to the ion conducting membrane 110, the density of platinum was 290 mg Pt/cm³ on average, and the density of ruthenium was 290 mg Ru/cm³ on average. In the second catalyst layer portion 202 of the anode catalyst layer 200, the density ρ2 was 1600 mg/cm³, and the pore diameter φ2 was 60 nm. Here, ρ1/ρ2 was 0.5. φ1/φ2 was 42/60, which is approximately equal to 0.7. According to the first example, in the anode catalyst layer 200, the density ρ1 of the first catalyst layer portion 201 was smaller than the density ρ2 of the second catalyst layer portion 202. The pore diameter φ1 (42 nm) of the first catalyst layer portion 201 was smaller than the pore diameter φ2 (60 nm) of the second catalyst layer portion 202. As described above, the components of the first catalyst layer portion 201 and the components of the second catalyst layer portion 202 are almost the same except ruthenium.

(1-3) Formation of First Catalyst Layer Portion 301 of Cathode Catalyst Layer 300

The cathode diffusion layer 500 employed commercially-available carbon paper (Toray Industries, Inc., 200 μm in thickness). The cathode catalyst ink was applied on the surface 500c of the cathode diffusion layer 500, facing the ion conducting membrane 110, with an applicator coater to thereby form the first catalyst layer portion 301 of the cathode catalyst layer 300. The applicator coating was performed with a gap of 400 μm set between the applicator blade and the cathode diffusion layer 500. In this case, in the first catalyst layer portion 301, the amount of platinum supported was 1.0 mg Pt/cm². In the first catalyst layer portion 301, the density of platinum was 1100 mg Pt/cm³ on average. In the first catalyst layer portion 301, the density ρc1 was 2000 mg/cm³, and the pore diameter (median diameter) φc1 was 68 nm. Note that the density and pore diameter for the cathode side have a suffix of "c" in reference numerals.

(1-4) Formation of Second Catalyst Layer Portion 302 of Cathode Catalyst Layer 300

The cathode catalyst ink was applied on the surface of a Teflon sheet with an applicator coater to thereby form the second catalyst layer portion 302. The applicator coating was performed with a gap of 200 μm set between the applicator blade and the Teflon sheet. In this case, in the second catalyst layer portion 302, the amount of platinum supported was 1.0 mg Pt/cm². The second catalyst layer portion 302 applied on the Teflon sheet as described above was transferred to the surface 110c of one side of the ion conducting membrane 110 (thickness: 30 μm). The transfer was performed at a temperature of 150° C. and at a pressure of 8 MPa. Note that the conditions of the transfer are not limited to them. In the second catalyst layer portion 302 transferred to the ion conducting membrane 110, the density of platinum was 1100 mg Pt/cm³ on average. In the second catalyst layer portion 302, the density ρc2 was 2000 mg/cm³, and the pore diameter ρc2 was 65 nm.

(2) Second Example

In the second example, the anode catalyst ink and cathode catalyst ink similar to those of the first example were used.

(2-1) Formation of First Catalyst Layer Portion 201 of Anode Catalyst Layer 200

The anode catalyst ink was applied on the surface 400a of the anode diffusion layer 400, facing the ion conducting membrane 110, with a spray coater to thereby form the first catalyst layer portion 201. The spray coating was performed with a nozzle aperture of 1.0 mm, at a height of 85 mm and at an atomization pressure of 0.3 MPa, as in the similar manner to the first example. However, the anode diffusion layer 400 is divided into three equal parts in the direction in which anode gas flows, and then the amount of catalyst (platinum-ruthenium) supported was increased from the upstream side toward the downstream side in a stepwise manner. That is, in the first catalyst layer portion 201, in the upstream region, the amount of platinum supported was 0.08 mg Pt/cm² and the amount of ruthenium supported was 0.08 mg Ru/cm²; in the midstream region, the amount of platinum supported was 0.2 mg Pt/cm² and the amount of ruthenium supported was 0.2 mg Ru/cm²; and in the downstream region, the amount of platinum supported was 0.32 mg Pt/cm² and the amount of ruthenium supported was 0.32 mg Ru/cm². The ratio of the amount of catalyst supported at the downstream side to the amount of catalyst supported at the upstream side was 0.32/0.08, which is equal to 4.

As a result, in the first catalyst layer portion 201 that constitutes the anode catalyst layer 200, the amount of platinum supported was 0.2 mg Pt/cm² on average, and the amount of ruthenium supported was 0.2 mg Ru/cm² on-average.

In the first catalyst layer portion 201, as in the case of the first example, the density of platinum was 150 mg Pt/cm³ on average, and the density of ruthenium was 150 mg Ru/cm³ on average. In the first catalyst layer portion 201, the density ρ1 was 830 mg/cm$^3$, and, furthermore, the pore diameter $\phi$1 was 42 nm as in the case of the first example.

(2-2) Formation of Second Catalyst Layer Portion 202 of Anode Catalyst Layer 200

The second catalyst layer portion 202 of the anode catalyst layer 200 was formed as in the similar manner to that of the first example. According to the second example, in the second catalyst layer portion 202 of the anode catalyst layer 200, the density $\rho$2 was 1600 mg/cm$^3$, and the pore diameter $\phi$2 was 60 nm. Thus, $\rho$1 was smaller than $\rho$2 ($\rho$1<$\rho$2), and $\rho$1/$\rho$2 was 0.5. Furthermore, $\phi$1 was smaller than $\phi$2 ($\phi$1<$\phi$2), and $\phi$1/$\phi$2 was 42 nm/60 nm, which is equal to 0.7.

(2-3) Formation of First Catalyst Layer Portion 301 of Cathode Catalyst Layer 300

The first catalyst layer portion 301 that constitutes the cathode catalyst layer 300 was formed under the same conditions as those of the first catalyst layer portion 301 according to the first example. The second catalyst layer portion 302 that constitutes the cathode catalyst layer 300 was also formed under the same conditions as those of the second catalyst layer portion 302 according to the first example.

(3) First Comparative Example

In the first comparative example, the anode catalyst ink and cathode catalyst ink similar to those of the first example were used.

(3-1) Formation of First Catalyst Layer Portion 201 of Anode Catalyst Layer 200 according to First Comparative Example In the first comparative example, the anode catalyst ink was applied on the surface 400$a$ of the anode diffusion layer 400, facing the ion conducting membrane 110, with a spray coater to thereby form the first catalyst layer portion 201. The applicator coating was performed with a gap of 350 μm set between the applicator blade and the Teflon sheet. In this case, in the first catalyst layer portion 201, the amount of platinum supported was 0.2 mg Pt/cm$^2$, and the amount of ruthenium supported was 0.2 mg Ru/cm$^2$. In the first catalyst layer portion 201, the density of platinum was 290 mg Pt/cm$^3$ on average, and the density of ruthenium was 290 mg Ru/cm$^3$ on average. According to the first comparative example, in the first catalyst layer portion 201 of the anode catalyst layer 200, the density $\rho$1 was 1600 mg/cm$^3$, and the pore diameter (median diameter) $\phi$1 of the first catalyst layer portion 201 was 60 nm, which is larger than that of the first example or the second example.

(3-2). Formation of Second Catalyst Layer Portion 202 of Anode Catalyst Layer 200 According to First Comparative Example The second catalyst layer portion 202 of the anode catalyst layer 200 according to the first comparative example was formed with an applicator coater under the same conditions as those of the second catalyst layer portion 202 according to the first example. According to the first comparative example, in the first catalyst layer portion 201 of the anode catalyst layer 200, the density $\rho$1 was 1600 mg/cm$^3$, which is substantially equal to the density $\rho$2 of the second catalyst layer portion 202, and, furthermore, the pore diameter $\phi$1 (60 nm) was substantially equal to the pore diameter $\phi$2 (60 nm) of the second catalyst layer portion 202. Thus, $\rho$1/$\rho$2 was 1.0, and $\phi$1/$\phi$2 was 60/60, which is equal to 1.

(3-3) Formation of First Catalyst Layer Portion 301 of Cathode Catalyst Layer 300 according to First Comparative Example The first catalyst layer portion 301 that constitutes the cathode catalyst layer 300 according to the first comparative example was formed under the same conditions as those of the first catalyst layer portion 301 according to the first example. In the first comparative example, the second catalyst layer portion 302 that constitutes the cathode catalyst layer 300 was also formed under the same conditions as those of the second catalyst layer portion 302 according to the first example.

(4) Second Comparative Example

In the second comparative example, the anode catalyst ink and cathode catalyst ink similar to those of the first example were used. Then, under the same conditions as those of the first example, the first catalyst layer portion 201 and second catalyst layer portion 202 of the anode catalyst layer 200 were formed. Thus, as in the case of the first example, $\rho$1/$\rho$2 was 0.5. $\phi$1/$\phi$2 was 42/60, which is approximately equal to 0.7.

(4-1) Formation of First Catalyst Layer Portion 301 of Cathode Catalyst Layer 300 According to Second Comparative Example The cathode diffusion layer 500 employed commercially-available carbon paper (Toray Industries, Inc., 200 μm in thickness). Then, the cathode catalyst ink was applied on the surface 500$c$ of the cathode diffusion layer 500, facing the ion conducting membrane 110, with a spray coater to thereby form the first catalyst layer portion 301. The spray coating was performed with a nozzle aperture of 0.6 mm, at a height of 85 mm and at an atomization pressure of 0.3 MPa. In this case, in the first catalyst layer portion 301, the amount of platinum (Pt) supported was 0.1 mg Pt/cm$^2$. In the coated first catalyst layer portion 301, the density of platinum was 770 mg Pt/cm$^3$ on average. The density $\rho$1c of the first catalyst layer portion 301 was 1400 mg/cm$^3$. The pore diameter $\phi$1c was 45 nm in median diameter.

(4-2) Formation of Second Catalyst Layer Portion 302 of Cathode Catalyst Layer 300 According to Second Comparative Example In the second comparative example, the second catalyst layer portion 301 of the cathode catalyst layer 300 was formed as in the similar manner to that of the first example. Thus, the density $\rho$2c of the second catalyst layer portion 302 was 2000 mg/cm$^3$. The pore diameter $\phi$2c was 65 nm in median diameter. The ratio of the pore diameters $\phi$1c/$\phi$2c was 45/65, which is approximately equal to 0.7.

(5) Formation of MEA 100

As can be understood from FIG. 1 and FIG. 2, the anode-side first catalyst layer portion 201 was laminated on the anode diffusion layer 400, the ion conducting membrane 110 was held between the anode-side second catalyst layer portion 202 and the cathode-side second catalyst layer portion 302, the cathode-side first catalyst layer portion 301 was laminated on the cathode diffusion layer 500, and then the anode diffusion layer 400, the ion conducting membrane 110 and the cathode diffusion layer 500 were laminated to thereby form a laminated body. Then, the laminated body was pressurized in the thickness direction (laminated direction) under the predetermined hot pressing conditions (at a temperature of 140° C. and at a pressure of 8 MPa) to closely adhere the layers to one another, thus forming the MEA 100. The hot pressing conditions are not limited to them.

Figure 9:
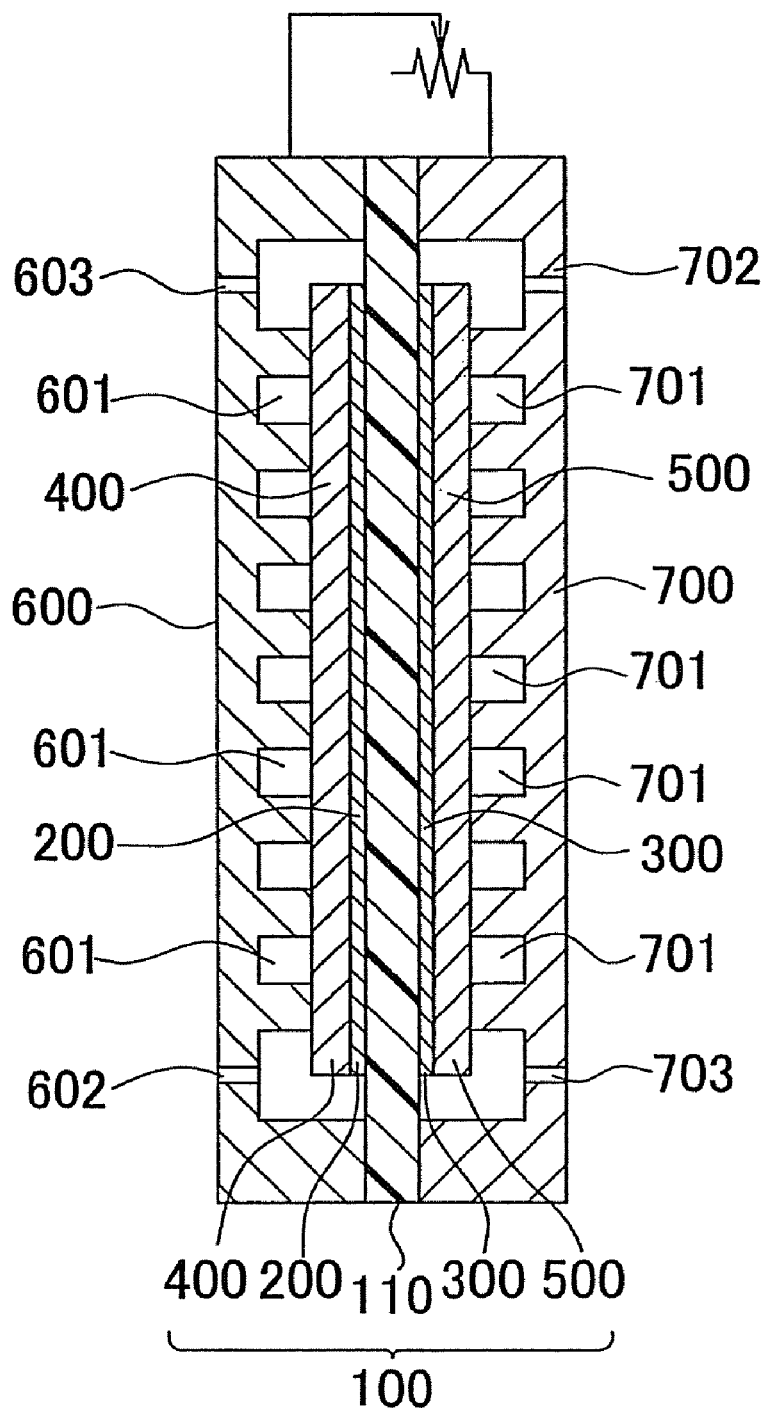
FIG. 9 is a cross-sectional view of a sample of a fuel cell.

The size of the MEA 100 was 90 mm by 150 mm. The above MEA 100 was held between a carbon-based anode flow distribution member 600 and a carbon-based cathode flow distribution member 700 to thereby form a sample of a fuel cell (see FIG. 9). The anode flow distribution member 600 includes groove-like passages 601 that allow anode gas to flow, an inlet 602, and an outlet 603. The cathode flow distribution member 700 includes passages 701 that allow cathode gas to flow, an inlet 702, and an outlet 703.

In the fuel cell, hydrogen gas (anode gas) that contains carbon monoxide having a predetermined concentration was supplied to the anode diffusion layer 400 of the MEA 100 via the passages 601 of the anode flow distribution member 600. Similarly, air (cathode gas) was supplied to the cathode diffusion layer 500 of the MEA 100 via the passages 701 of the cathode flow distribution member 700. In this manner, power generation reaction was initiated. Hydrogen gas was supplied at a pressure of 1 atm (absolute pressure), and air was supplied at a pressure of 1 atm (absolute pressure).

In this case, durability test was conducted at 0.34 A/cm². The hydrogen utilization was adjusted to 90%, the air utilization to 50%, the dew point of anode gas to 60° C., and the dew point of cathode gas to 65° C. Furthermore, the electric current density was set to 0.26 A/cm², and the cell stack temperature was set to 65° C. After that, the voltage characteristics of the fuel cell were measured. The measured results are shown in FIG. 10.

Figure 10:
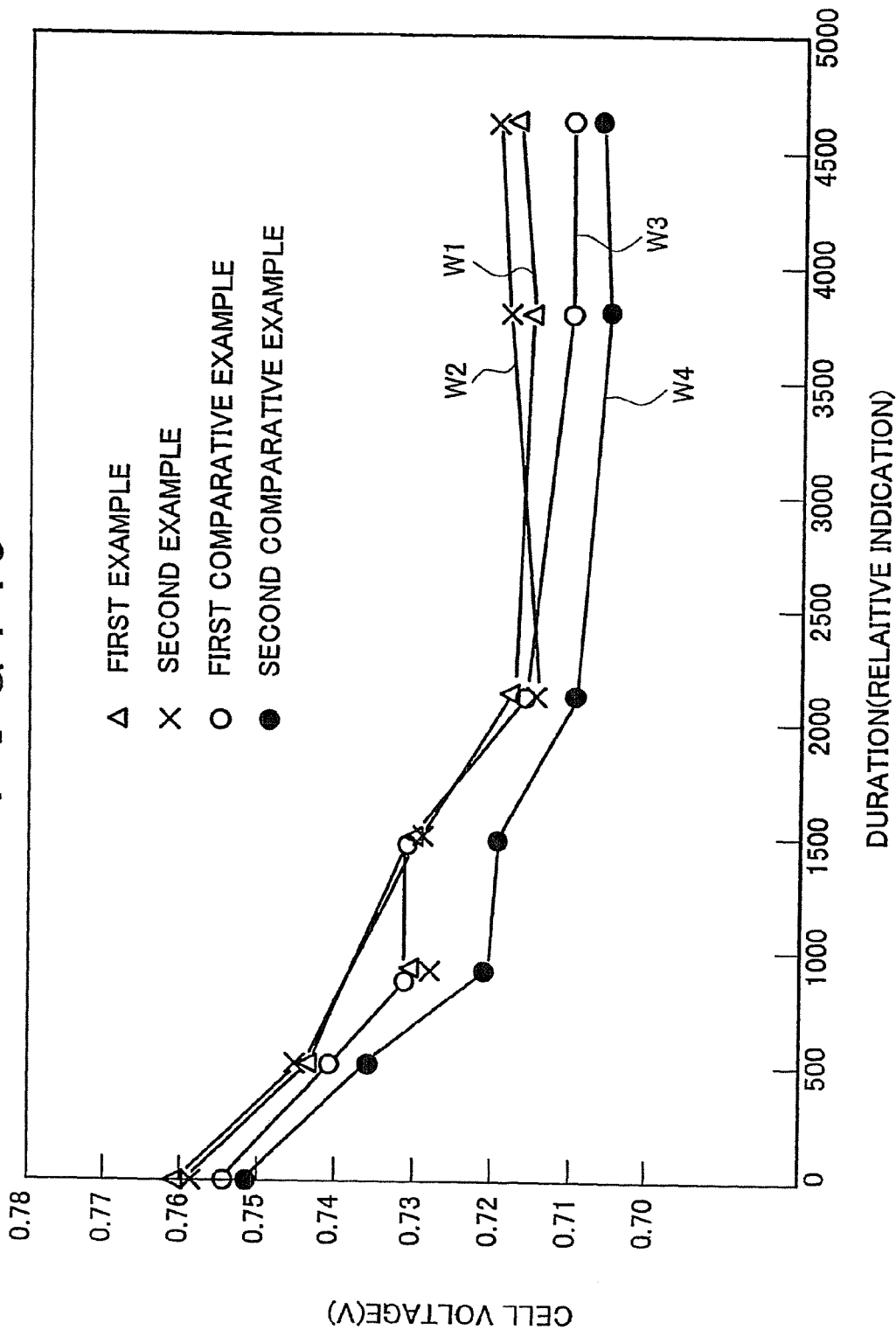
FIG. 10 is a graph of the test results that shows the relationship between duration and a cell voltage.

FIG. 10 shows the relationship between duration and a cell voltage when anode gas contains 20 ppm (mass ratio) of carbon monoxide. The characteristic line W1 represents the first example. The characteristic line W2 represents the second example. The characteristic line W3 represents the first comparative example. The characteristic line W4 represents the second comparative example. As shown by the characteristic lines W3 and W4 in FIG. 10, as duration during which the fuel cell generates power increases, a decrease in cell voltage is large in the first and second comparative examples. It may be presumed that the anode catalyst layer 200 is influenced by catalyst poisoning due to carbon monoxide. In contrast, as shown by the characteristic lines W1 and W2, a decrease in cell voltage is smaller in the first and second examples than in the first and second comparative examples. It may be presumed that catalyst poisoning due to carbon monoxide is suppressed.

Figure 11:
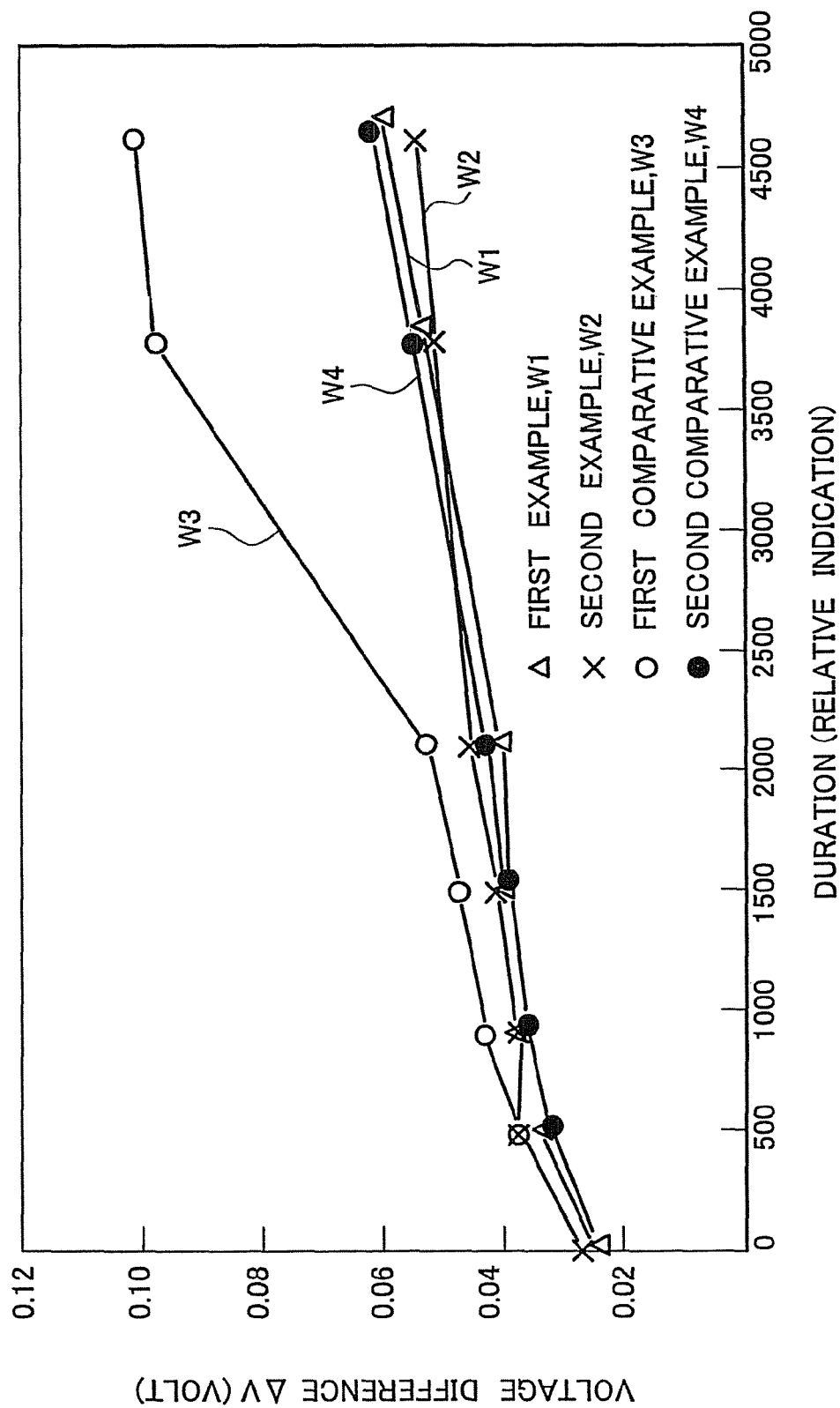
FIG. 11 is a graph of the experimental results that shows the relationship between duration and a voltage difference.

Furthermore, the case in which pure hydrogen gas that contains no carbon monoxide is supplied to the anode and the case in which hydrogen gas that contains 100 ppm of carbon monoxide in mass ratio is supplied to the anode were tested. A voltage difference ΔV between both cases was measured. Then, the relationship between duration during which the fuel cell generates power and a voltage difference ΔV between both cases was obtained. The results are shown in FIG. 11. The characteristic line W1 represents the first example. The characteristic line W2 represents the second example. The characteristic line W3 represents the first comparative example. The characteristic line W4 represents the second comparative example. As shown in FIG. 11, the voltage difference ΔV is large in the first and second comparative examples. Moreover, the voltage difference ΔV is considerably large in the first comparative example.

As shown in the above described test results, in the second comparative example, in the anode catalyst layer 200 that is subject to carbon monoxide, $\phi 1$ is smaller than $\phi 2$, and also in the cathode catalyst layer 300 that is not subject to carbon monoxide, the relationship similar to the anode catalyst layer 200 is applied, that is, the density $\rho 1c$ of the first catalyst layer portion 301 is smaller than the density $\rho 2c$ of the second catalyst layer portion 302.

However, according to the second comparative example, as can be seen from the above test results, a decrease in power generated by the fuel cell was large. Here, it is advantageous that the relationship that $\phi 1$ is smaller than $\phi 2$ is applied to the anode catalyst layer 200 that may be influenced by catalyst poisoning due to carbon monoxide being supplied thereto. On the other hand, it is not advantageous that the structure similar to that of the anode catalyst layer 200 that is subject to carbon monoxide is applied to the cathode catalyst layer 300 that will not be influenced by catalyst poisoning because of no carbon monoxide being supplied thereto.

It is not clear at the present moment why the cathode catalyst layer 300 will not be influenced by poisoning. However, the first catalyst layer portion 301 and the second catalyst layer portion 302 are laminated to form the cathode catalyst layer 300, so the thickness of the cathode catalyst layer 300 tends to increase. This can presumably restrict mobility of active material in the cathode catalyst layer 300.

Hereinafter, an example of a fuel cell system to which the embodiments of the invention are applied will be described with reference to FIG. 12. The fuel cell system includes a reformer 2, a raw fuel supply passage 3, an aqueous raw material supply passage 5, and a control unit 6. The reformer 2 generates fuel gas in such a manner that raw fuel undergoes reforming reaction. The raw fuel supply passage 3 is connected to an inlet 2i of the reformer 2. The aqueous raw material supply passage 5 is connected to an inlet 2r of the reformer 2. The control unit 6 controls the raw fuel supply passage 3 and the aqueous raw material supply passage 5. Thus, the control unit 6 controls devices equipped for the raw fuel supply passage 3 and devices equipped for the aqueous raw material supply passage 5.

Figure 12:
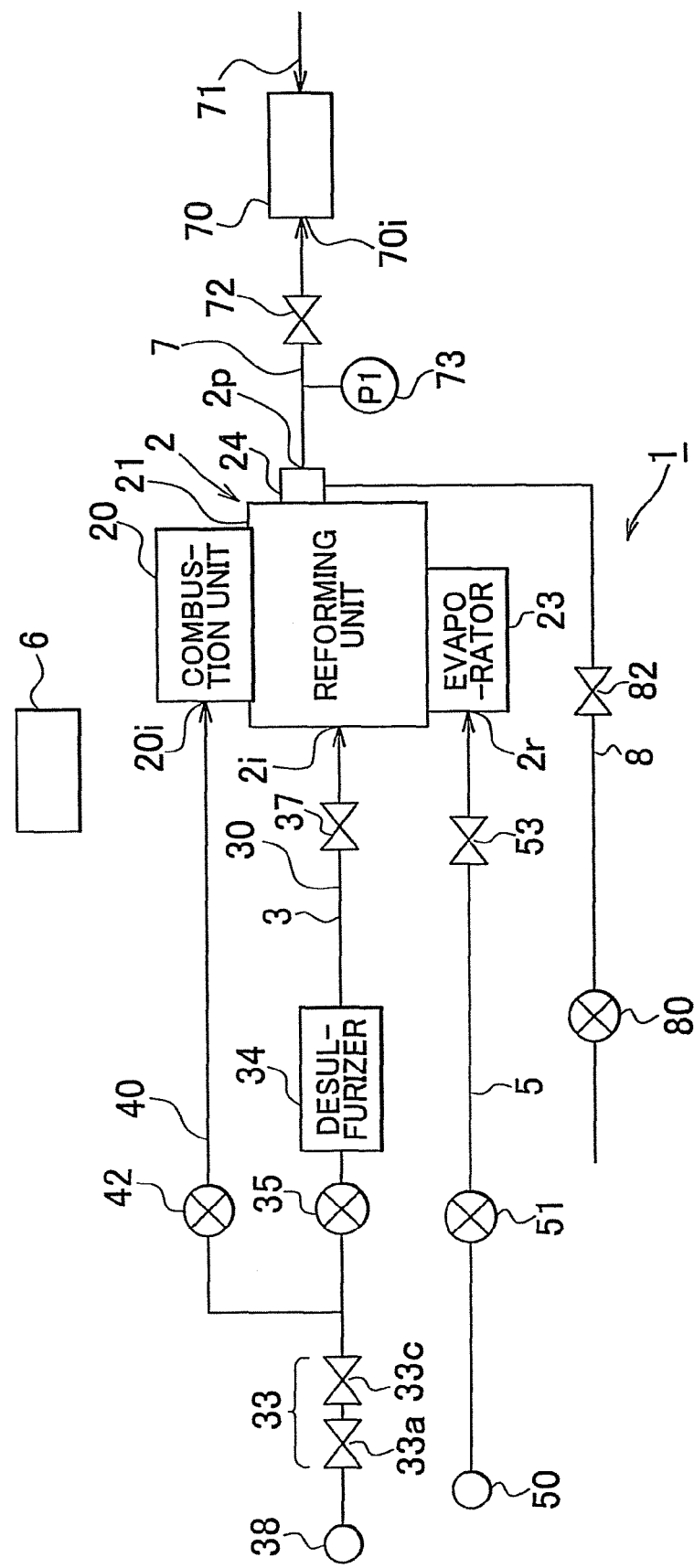
FIG. 12 is a view that shows an example in which the embodiments of the invention is applied to a fuel cell system.

As shown in FIG. 12, the raw fuel supply passage 3 is used to supply gaseous raw fuel (hydrocarbon-based raw gas such as natural gas) from a raw fuel source 38 to the reformer 2 for reforming raw fuel during operation of the fuel cell system. The raw fuel supply passage 3 includes a main passage 30 that connects the raw fuel source 38 with the inlet 2i of the reformer 2 and a combustion passage 40 provided in parallel with the main passage 30. The combustion passage 40 communicates with the raw fuel source 38 and an inlet 20i of a combustion unit 20. The raw fuel source 38, a main valve 33, a desulfurizer 34, a raw gas pump 35, and an inlet valve 37 are serially provided in the main passage 30 from the upstream side to the downstream side. The main valve 33 is formed of two serially arranged valves 33a and 33c. The combustion passage 40 is provided with a combustion gas pump 42.

As shown in FIG. 12, an anode gas passage 7 is provided so as to connect an outlet 2p of the reformer 2 with an inlet 70i of a fuel cell stack 70. The anode gas passage 7 is used to supply anode gas, reformed in a reforming unit 21, to the fuel cell stack 70. The fuel cell stack 70 is supplied with cathode gas from a cathode gas passage 71, and generates electric energy by power generation reaction. The anode gas passage 7 includes an outlet valve 72 that opens or closes the side of the outlet 2p of the reformer 2 and a pressure sensor 73 that detects an internal pressure P1 in the reformer 2. The aqueous raw material supply passage 5 is used to supply aqueous raw material to the reformer 2 for reforming reaction during operation of the fuel cell system. A raw material water source 50, a raw material water pump 51, a feedwater valve 53, and an evaporator 23 are serially arranged in the aqueous raw material supply passage 5 from the upstream side to the downstream side.

As shown in FIG. 12, a CO purification passage 8 is provided so as to be connected to a CO purification unit 24 of the reformer 2. The CO purification passage 8 is provided with an air pump 80 and an air valve 82 serially from the upstream side to the downstream side. Carbon monoxide (CO) is oxidized by oxygen contained in air supplied from the CO purification passage 8 to the CO purification unit 24 to become carbon dioxide ($CO_2$). In this manner, the CO component contained in reformed gas is removed.

During steady operation of the fuel cell stack 70, while the main valve 33 is open, the combustion gas pump 42 operates. Thus, gaseous raw fuel is supplied from the raw fuel source 38 to the combustion unit 20. By so doing, combustion reaction occurs in the combustion unit 20, and the reforming unit 21 and evaporator 23 of the reformer 2 are heated to a high temperature. Furthermore, while the inlet valve 37 and the outlet valve 72 are open, the raw gas pump 35 operates. As a result, gaseous raw fuel is supplied from the raw fuel source 38 to the reforming unit 21 of the reformer 2. In addition, in the aqueous raw material supply passage 5, while the feedwater valve 53 is open, the raw material water pump 51 operates. Thus, an aqueous raw material, as a liquid, is supplied to the evaporator 23 via the feedwater valve 53. Because the evaporator 23 is heated to a high temperature, an aqueous raw material, as a liquid, is heated to become a vapor in the evaporator 23, and the vapor is supplied to the reforming unit 21. As a result, in the reforming unit 21, raw fuel undergoes reforming reaction utilizing the vapor.

Hydrogen-rich anode gas is transferred to the CO purification unit 24. In the CO purification unit 24, CO contained in the fuel gas is oxidized and removed from the fuel gas. The anode gas, from which CO has been removed, is supplied from the outlet 2p of the reformer 2 via the anode gas passage 7 to the fuel cell stack 70, and then used for power generation reaction in the stack 70 together with oxidant gas.

As described above, anode gas generated by reforming reaction from raw fuel mostly contains CO. The amount of CO is reduced in the CO purification unit 24; however, the anode gas mostly still contains a small amount of CO. In terms of this point, the fuel cells that constitute the stack 70 are formed in accordance with any one of the above described embodiments or examples, so measures are taken against CO. Thus, even when the duration of service extends over a long period of time, a decrease in power generated by the fuel cells is suppressed.

The invention is not limited to the embodiments or examples described above; it may be changed appropriately without departing from the scope of the invention. The following technical ideas may be derived from the above description.

The membrane electrode assembly for a fuel cell according to the above embodiments includes an ion conducting membrane that has two sides in the thickness direction; a porous anode catalyst layer that is arranged on one side of the ion conducting membrane and that has an anode catalyst that accelerates anode reaction; a porous cathode catalyst layer that is arranged on the other side of the ion conducting membrane and that has a cathode catalyst that accelerates cathode reaction; an anode diffusion layer that is arranged on the outer side of the anode catalyst layer and that allows an anode fluid to pass therethrough; and a cathode diffusion layer that is arranged on the outer side of the cathode catalyst layer and that allows a cathode fluid to pass therethrough. The anode catalyst layer includes a first catalyst layer portion and a second catalyst layer portion. The first catalyst layer portion is located closer to the anode diffusion layer than the second catalyst layer portion, and the second catalyst layer portion is located closer to the ion conducting membrane than the first catalyst layer portion. Then, for example, the first catalyst layer portion may be formed by spray coating, and the second catalyst layer portion may be formed by applicator coating.

The invention may be utilized in a fuel cell system, such as a stationary fuel cell system, a vehicle fuel cell system, a fuel cell system for an electrical apparatus, a fuel cell system for an electronic apparatus or a portable fuel cell system.

The invention claimed is:

1. A membrane electrode assembly for a polymer electrolyte fuel cell, comprising:

an ion conducting membrane having two sides in a thickness direction thereof;

a porous anode catalyst layer that is laminated on one side of the ion conducting membrane and that has an anode catalyst that accelerates anode reaction;

a porous cathode catalyst layer that is laminated on the other side of the ion conducting membrane and that has a cathode catalyst that accelerates cathode reaction;

an anode diffusion layer that is laminated on an outer side of the anode catalyst layer and that allows an anode fluid to pass therethrough; and a cathode diffusion layer that is laminated on an outer side of the cathode catalyst layer and that allows a cathode fluid to pass therethrough, wherein the anode catalyst in the anode catalyst layer contains a poisoning-suppression catalytic component, including at least one of ruthenium, tin, osmium, rhodium, palladium, nickel, copper, cobalt, manganese, zinc, iridium, and iron, that reduces poisoning of carbon monoxide contained in the anode fluid, the anode catalyst layer includes a first catalyst layer portion and a second catalyst layer portion, the first catalyst layer portion is located closer to the anode diffusion layer than the second catalyst layer portion, and the second catalyst layer portion is located closer to the ion conducting membrane than the first catalyst layer portion, the density of the first catalyst layer portion is smaller than the density of the second catalyst layer portion, the pore diameter of the first catalyst layer portion is smaller than the pore diameter of the second catalyst layer portion, and wherein the anode fluid flows from an upstream side of the anode catalyst layer toward a downstream side of the anode catalyst layer, and the amount of poisoning-suppression catalytic component supported per unit area is increased from the upstream side of the anode catalyst layer to the downstream side of the anode catalyst layer.

2. A polymer electrolyte fuel cell comprising:

the membrane electrode assembly according to claim 1;

an anode flow distribution member that is located on an outer side of the anode diffusion layer of the membrane electrode assembly and that supplies the anode fluid to the membrane electrode assembly; and a cathode flow distribution member that is located on an outer side of the cathode diffusion layer of the membrane electrode assembly and that supplies the cathode fluid to the membrane electrode assembly.

3. A polymer electrolyte fuel cell system comprising:
a reformer that reforms raw fuel into an anode fluid; and
the polymer electrolyte fuel cell according to claim 2, wherein the polymer electrolyte fuel cell includes:
an anode that is supplied with the anode fluid reformed in the reformer; and
a cathode that is supplied with the cathode fluid.

4. The polymer electrolyte fuel cell according to claim 2, wherein the anode catalyst is a metal and the ion conducting member is a polymer electrolyte member.

* * * * *